United States Patent [19]

Ohuchi

[11] Patent Number: 5,152,273
[45] Date of Patent: Oct. 6, 1992

[54] EXHAUST GAS RECIRCULATION CONTROL DEVICE AND ITS FAILURE DIAGNOSIS DEVICE

[75] Inventor: Hirofumi Ohuchi, Himeji, Japan

[73] Assignee: Mitsubishi Denki Kabushiki Kaisha, Tokyo, Japan

[21] Appl. No.: 778,245

[22] Filed: Oct. 17, 1991

[30] Foreign Application Priority Data

Nov. 7, 1990 [JP] Japan ................................ 2-305054
Nov. 7, 1990 [JP] Japan ................................ 2-305055

[51] Int. Cl.$^5$ ............................................ F02M 25/07
[52] U.S. Cl. .................................................... 123/571
[58] Field of Search ................... 123/571; 364/431.06

[56] References Cited

U.S. PATENT DOCUMENTS

| | | | |
|---|---|---|---|
| 4,640,257 | 2/1987 | Kodama et al. ................ | 123/571 |
| 4,671,107 | 6/1987 | Chiesa et al. ................... | 123/571 |
| 4,715,348 | 12/1987 | Kobayashi et al. ............. | 123/571 |
| 4,770,146 | 9/1988 | Shibata et al. .................. | 123/571 |
| 4,825,841 | 5/1989 | Norota et al. ................... | 123/571 |
| 4,938,198 | 7/1990 | Suzuki ............................. | 123/571 |
| 4,967,717 | 11/1990 | Miyazaki et al. ................ | 123/571 |

FOREIGN PATENT DOCUMENTS

| | | |
|---|---|---|
| 27922 | 3/1977 | Japan ................................ 123/571 |
| 51747 | 3/1987 | Japan ................................ 123/571 |
| 2-36785 | 8/1990 | Japan . |

Primary Examiner—Willis R. Wolfe
Attorney, Agent, or Firm—Sughrue, Mion, Zinn, Macpeak & Seas

[57] ABSTRACT

An exhaust gas recirculation control device adapted to control a recirculation of part of exhaust gas of an internal combustion engine back to the engine which comprises a recirculation pipe for recirculating the exhaust gas of the internal combustion engine back to an intake air pipe; a recirculation valve for controlling a flow quantity of the exhaust gas flowing in the recirculation pipe; a recirculation valve passage area controlling means for controlling a passage area of the recirculation valve; a running condition detecting means for detecting a running condition of the internal combustion engine; a pressure difference detecting means for detecting a pressure difference between pressures at two arbitrary points in the recirculation pipe from an exit of the recirculation valve to the intake air pipe or a pressure difference between pressures at two arbitrary points in the recirculation pipe from an inlet of the recirculation valve to an exhaust pipe; a first exhaust gas recirculation ratio calculating means for calculating a first exhaust gas recirculation ratio from the pressure difference and a detected value of the running condition detecting means; and a second exhaust gas recirculation ratio calculating means for calculating a second exhaust gas recirculation ratio corresponding with the detected value of the running condition detecting means; wherein a feed back control is performed in which the passage area of the recirculation valve is increased or decreased so that a difference between the first exhaust gas recirculation ratio and a second exhaust gas recirculation ratio is nullified.

6 Claims, 12 Drawing Sheets

EXHAUST GAS RECIRCULATION CONTROL DEVICE AND ITS FAILURE DIAGNOSIS DEVICE

BACKGROUND OF THE INVENTION

1. Field of the Invention

The present invention relates to an exhaust gas recirculation control device wherein a control is performed in which a part of exhaust gas of an internal combustion engine is recirculated back to an intake air pipe of the internal combustion engine, and its failure diagnosis device.

2. Discussion of Background

Formerly, an exhaust gas recirculation control device (hereinafter, EGR control device) which performs a control of exhaust gas recirculation, (hereinafter, EGR) as a means decreasing $NO_x$ in the exhaust gas of the internal combustion engine, is widely utilized. This EGR control device controls EGR by an exhaust pressure control system using BPT (Back Pressure Transducer) valve.

That is to say, a passage area of an EGR valve (recirculation valve) is controlled by a BPT valve so that a flow quantity of EGR becomes a predetermined value. Furthermore, in a system using a VVT (Venturi Vacuum Transducer) and a system in which the EGR control pressure is controlled by using a solenoid, similar to the system using the BPT valve, the passage area of the EGR valve is controlled.

As a means of diagnosing a failure of such EGR control device, conventionally, a device is proposed which is shown in Japanese Unexamined Patent Publication No. 256546/1985. In this device, a pressure difference between pressure values of a place adjacent to an exit of the EGR valve and an intake pipe, a clogging of the EGR valve is determined from the condition of the pressure difference.

Since the above-mentioned conventional EGR control device is composed using a VVT valve or the like, an exhaust gas recirculation quantity, that is, an EGR flow quantity can not be detected directly. As a result, when the EGR flow quantity is increased due to a deterioration of the BPT valve or the like, worsening of the drivability is caused. When the EGR flow quantity is decreased, the temperature of the engine is elevated and the $NO_x$ composition in the exhaust gas is increased. When the internal combustion engine is started up by making an ignition key switch ON, the actual EGR ratio, (first exhaust gas recirculation ratio) does not agree with a target EGR ratio (second exhaust gas recirculation ratio) for the time being by an influence of a timewise change or the like, the worsening of exhaust gas is caused for that period. Furthermore, when this device is in abnormal state, due to a deterioration of parts in the EGR control device, the abnormality of the device is difficult to be detected since the EGR flow quantity can not be detected directly.

On the other hand, in the above-mentioned conventional failure diagnose device of the EGR control device, although the clogging of the EGR valve can be detected to some degree, a failure diagnosis in case that the EGR flow quantity is increased due to a deterioration of BPT or the like, can not be performed accurately.

SUMMARY OF THE INVENTION

It is an object of the present invention to solve the above problems.

According to an aspect of the present invention, there is provided an exhaust gas recirculation control device adapted to control a recirculation of a part of exhaust gas of an internal combustion engine back to the internal combustion engine which comprises a recirculation pipe for recirculating the exhaust gas of the internal combustion engine back to an intake air pipe; a recirculation valve for controlling a flow quantity of the exhaust gas flowing in the recirculation pipe; a recirculation valve passage area controlling means for controlling a passage area of the recirculation valve; a running condition detecting means for detecting a running condition of the internal combustion engine; a pressure difference detecting means for detecting a pressure difference between pressures at two arbitrary points in the recirculation pipe from an exit of the recirculation valve to the intake air pipe or a pressure difference between pressures at two arbitrary points in the recirculation pipe from an inlet of the recirculation valve to an exhaust pipe; a first exhaust gas recirculation ratio calculating means for calculating a first exhaust gas recirculation ratio from the pressure difference and a detected value of the running condition detecting means; and a second exhaust gas recirculation ratio calculating means for calculating a second exhaust gas recirculation ratio corresponding with the detected value of the running condition detecting means; wherein a feed back control is performed in which the passage area of the recirculation valve is increased or decreased so that a difference between the first exhaust gas recirculation ratio and the second exhaust gas recirculation ratio is nullified.

According to another aspect of the present invention, there is provided the exhaust gas recirculation control device of the first invention, wherein the pressure difference is a difference between pressure values of the intake air pipe and at the exit of the recirculation valve.

According to another aspect of the present invention, there is provided the exhaust gas recirculation control device of the first invention, further comprising a memory means for memorizing the difference between the first and the second exhaust gas recirculation ratios, or a value corresponding with the difference.

According to another aspect of the present invention, there is provided the exhaust gas recirculation control device of the first invention, further comprising a failure diagnosis means for diagnosing a failure of the exhaust gas recirculation control device by detecting a disagreement between the first and the second exhaust gas recirculation ratios.

According to another aspect of the present invention, there is provided a failure diagnosis device of an exhaust gas recirculation device adapted to control a recirculation of a part of exhaust gas of an internal combustion engine back to the internal combustion engine which comprises a recirculation pipe for recirculating the exhaust gas of the internal combustion engine back to an intake air pipe; a recirculation valve for controlling a flow quantity of the exhaust gas flowing in the recirculation pipe; a recirculation valve passage area controlling means for controlling a passage area of the recirculation valve; a running condition detecting means for detecting a running condition of the internal combustion engine; a pressure detecting means for detecting a pressure at an exit of the recirculation valve; a pressure difference detecting and correcting means for detecting a pressure difference between an intake air pipe pressure detected by the running condition detecting means and the pressure at the exit of the recirculation valve, correcting the pressure difference based on the intake air pipe pressure; a determining means for determining whether a corrected value of the pressure difference is in a predetermined range; and an alarming means for alarming when the determining means determines that the corrected value of the pressure difference is out of the predetermined range.

In the preceding invention, it is possible to correct the pressure difference, by a value of a function of a measured value of an intake air quantity for the internal combustion engine or a revolution number of the internal combustion engine, and a throttle opening degree.

DETAILED DESCRIPTION OF THE PREFERRED EMBODIMENTS

Next, explanation will be given to an exhaust gas recirculation control device of the present invention referring the drawings.

Figure 1:
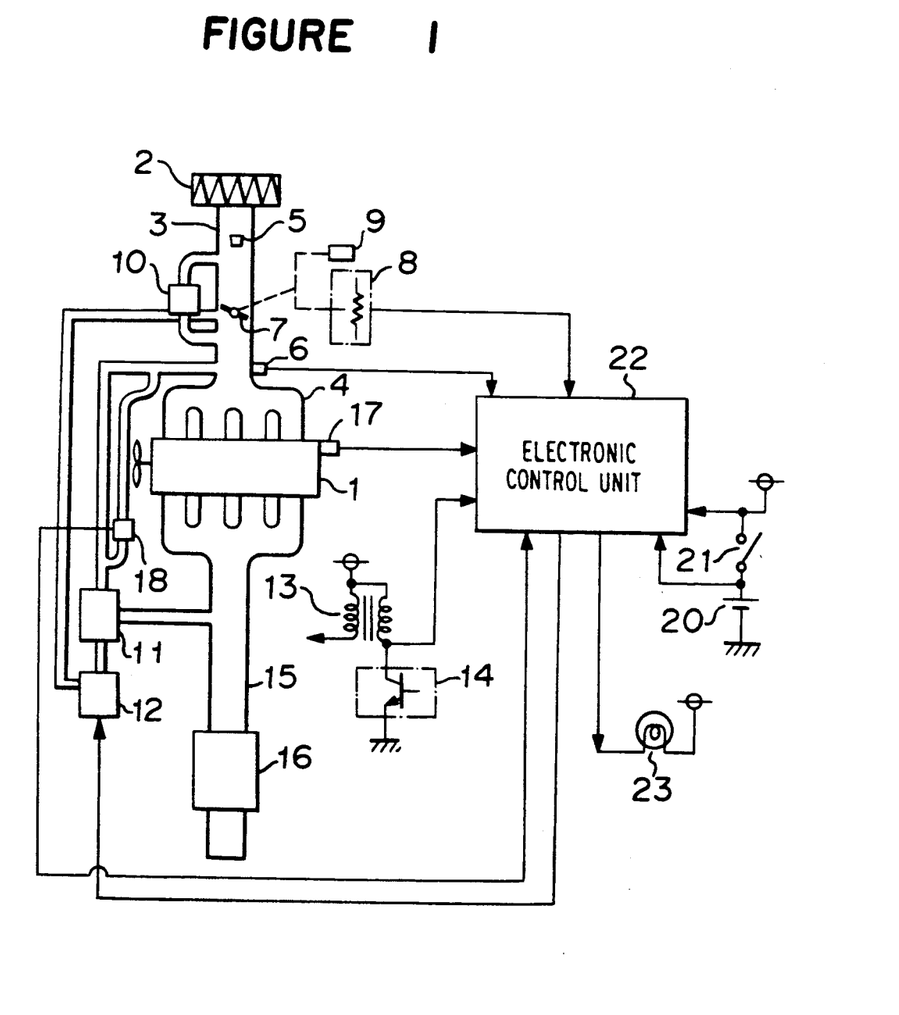
FIG. 1 is a block diagram showing an embodiment of an exhaust gas recirculation control device according to the present invention.

FIG. 1 is a block diagram showing an embodiment of the exhaust gas recirculation control device according to the present invention. In FIG. 1, a reference numeral designates an engine, 3, an intake air pipe, 4, an intake manifold, 5, an injector, 6, a pressure sensor, 7, a throttle valve, 8, a throttle opening degree sensor, 11, a recirculation valve, 12, a passage area control actuator (hereinafter, EGR solenoid), 13, an ignition coil, 14, an igniter, 15, an exhaust pipe, 17, a water temperature sensor, 18, a pressure difference sensor, 20, a battery, 21, an ignition key switch, 22, an electronic control unit, and 23, an alarming lamp.

In FIG. 1, the pressure sensor 6 is a semiconductor type pressure sensor which detects an intake air pressure for measuring a quantity of air sucked to the engine 1 from the intake air pipe 3 through the intake manifold 4. The injector 5 is located at the upstream side of the throttle valve 7, and performs fuel injection. The throttle opening sensor 8 is attached to the throttle valve 7 for detecting an opening degree of the throttle valve. The water temperature sensor 17 is a thermister type sensor which detects a cooling water temperature of the engine 1. The ignition coil 13 performs ignition by a signal from the igniter 14, and sends the generated ignition signal to the electronic control unit 22.

The recirculation valve 11 is a vacuum servo type valve which is located in an exhaust gas recirculation passage which connects the intake air pipe 3 with the exhaust pipe 15. The EGR solenoid 12 is connected to between a diaphragm chamber of the recirculation valve 11 and the intake air pipe 3, and controls a negative pressure of gas to the diaphragm chamber of the recirculation valve 11 by a signal from the electronic control unit 22. The passage area of the recirculation valve 11 becomes variable by the negative pressure of the diagram chamber. A bypass of the recirculation passage of the exhaust gas is provided between the intake air pipe 3 and a place adjacents to an exit of the recirculation valve 11. The pressure difference sensor 18 is provided in the bypass, which detects the pressure difference between the pressure values of the intake air pipe and a place at adjacent to the exit of the recirculation valve 11, that is, a pressure difference between two points.

Figure 2:
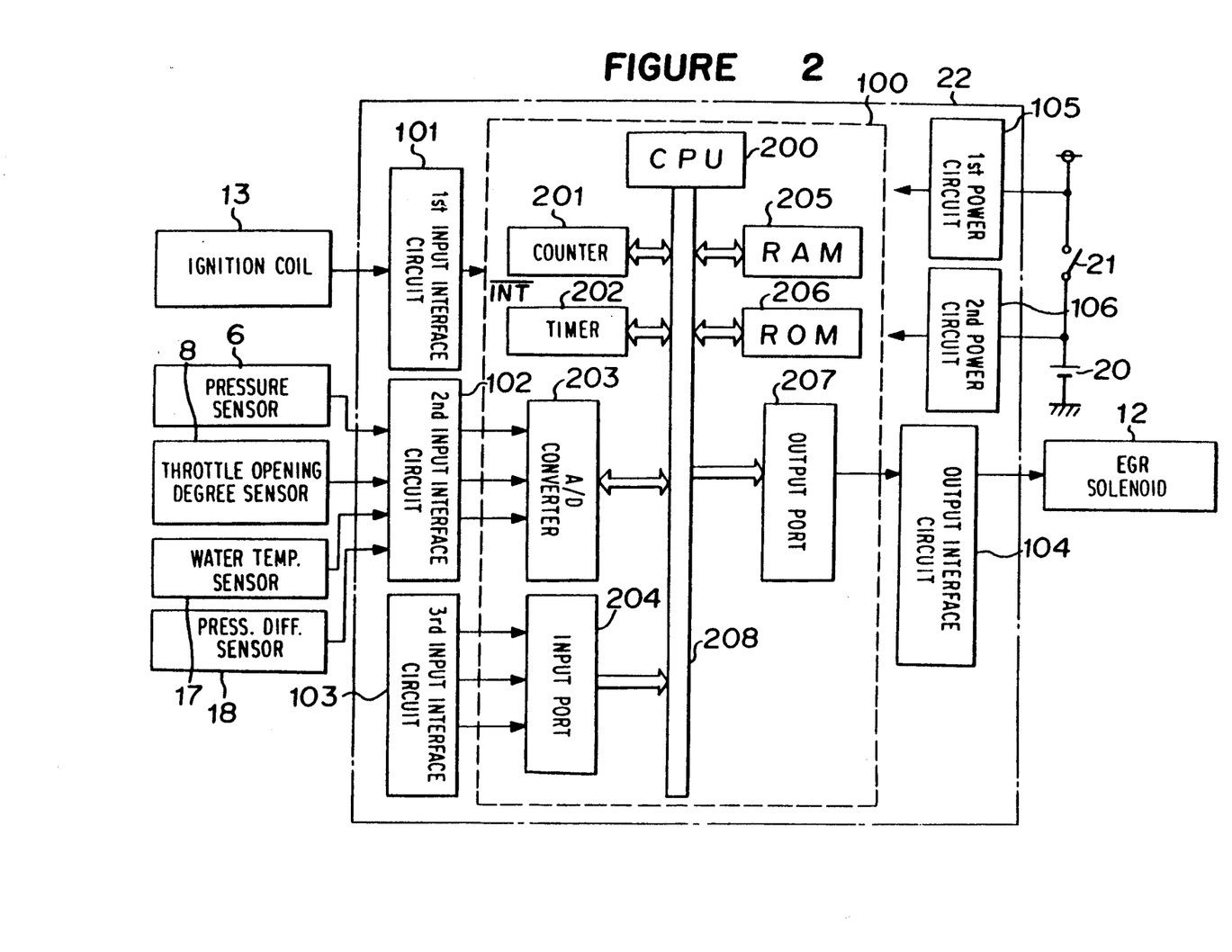
FIG. 2 is a block diagram of an electronic control unit which controls the device.

Next, the electronic control unit 22 receives the respective signals of the pressure sensor 6, the throttle opening degree sensor 8, the ignition coil 13, and the water temperature sensor 17, and controls the passage area of the EGR recirculation valve 11. Accordingly, the electronic control unit 22 obtains a control quantity of the EGR solenoid 12 for controlling the EGR quantity, and controls to drive EGR solenoid 12. FIG. 2 is a detailed block diagram of the electronic control unit 22. In FIG. 2, a reference numeral 100 designates a microcomputer, which is composed of the CPU 200 which calculates a control quantity of the EGR solenoid 12 or the like following predetermined programs, the free running counter 201 for measuring a rotation period of the engine 1, the timer 202 which measures by clock a duty ratio of the drive signal applied to the EGR solenoid, the A/D converter 203 which converts an analogue input signal to a digital signal, the RAM 205 utilized as a work memory, the ROM 206 which memorizes programs, the output port 207 for outputting the drive signal, and the common bus 208 or the like. A numeral 101 designates a first input interface circuit which shapes a primary side ignition signal of the ignition coil 13, and outputs it to the microcomputer 100 as an interruption signal. When the interruption signal is generated, the CPU 200 reads the value of the counter 201, calculates the period of the engine revolution number from difference between the current read value and the preceding read value, which is memorized by the RAM 205. A numeral 102 designates a second input interface circuit, which receives respective signals of the pressure sensor 6, the throttle opening degree sensor 8, the water temperature sensor 17 and the pressure difference sensor 18 or the like, and outputs them to the A/D converter 203. A numeral 104 designates an output interface circuit, which amplifies the drive output of the output port 207, and outputs it to the EGR solenoid 12.

Figure 3:
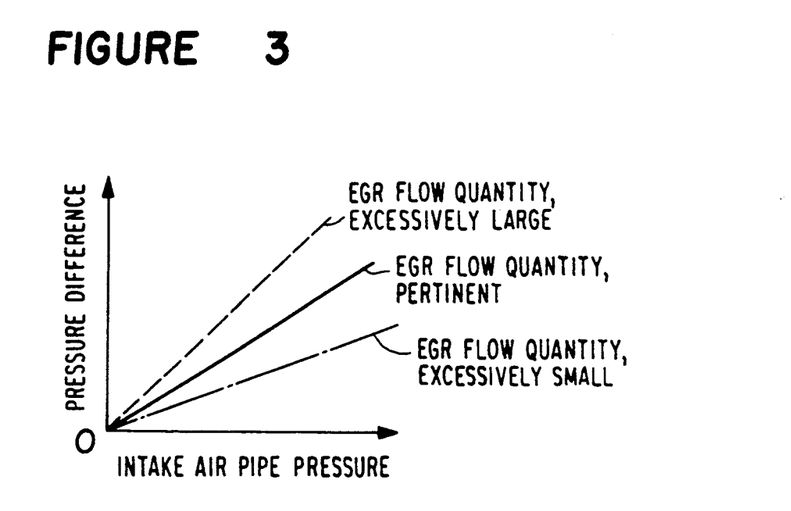
FIGS. 3 and 4 are explanatory diagrams describing characteristics of the device.

FIG. 3 is an explanatory diagram showing a relationship between a pressure difference between two points which is outputted from a pressure of the intake air pipe 3, and the pressure difference sensor 18. According to the explanatory diagram, the more the EGR flow quantity, the larger the output value of the pressure difference between two points, that is, the output value of the pressure difference sensor 18.

Figure 4:
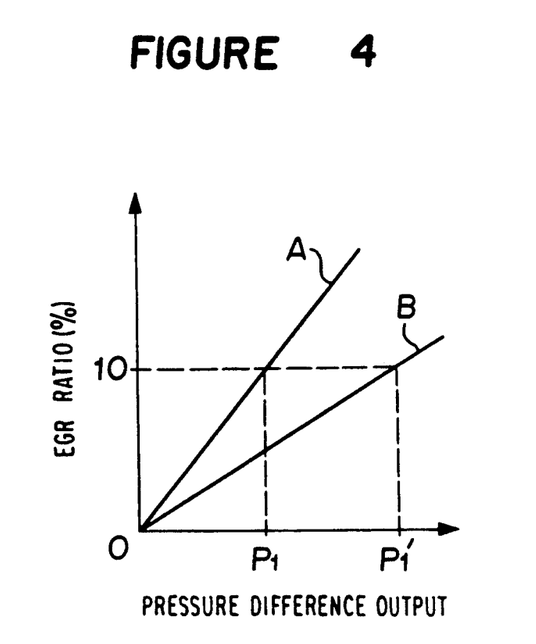

FIG. 4 is an explanatory diagram showing a relationship between the output of the pressure difference sensor 18 and the EGR ratio in different running conditions, that is, in different load states of the internal combustion engine. According to the explanatory diagram, the pressure difference between two points of the pressure difference sensor 18 and the EGR ratio becomes different between case A and case B of the load state of the internal combustion engine. In this invention, calculation of the actual EGR ratio is performed considering the load state of the internal combustion engine. As a result, a pertinent EGR flow quantity is controlled which corresponds with a running condition of the engine.

In the followings, explanation will be given to the operation of the CPU 200 of the exhaust gas recirculation control device of the present invention, referring flow charts of FIGS. 5 and 6.

Figure 5:
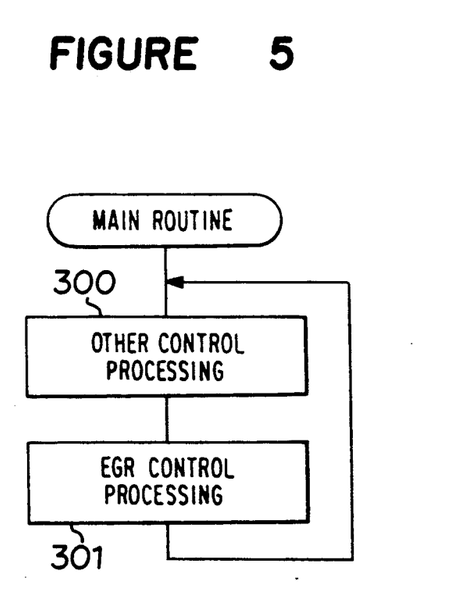
FIGS. 5 and 6 are flow charts describing the operation of the device.

FIG. 5 shows the processing of the main routine. In step 300, the operation performs other control processings. When the other control processing is finished, in step 301, the operation performs the EGR control processing which carries out the recirculation control of the exhaust gas, and the operation returns to step 300 again.

Next, explanation will be given to the EGR control processing referring to FIG. 6.

In step 350, the operation detects the engine revolution number, Ne. In step 351, the operation detects the intake air pipe pressure Pb. In step 352, the operation determines the EGR operational range. In step 353, the operation determines whether the engine is in the EGR operation range. When the engine is out of the EGR operational range, in step 354, the operation calculates the target EGR ratio $T_{EGR}$ (second exhaust gas recirculation ratio) from the engine revolution number Ne and the intake air pipe pressure value Pb, and in step 355, the operation calculates the basic EGR control quantity $K_{BASE}$ corresponding with the target EGR ratio $T_{EGR}$.

Furthermore, in step 356, the operation detects the pressure difference P1 between pressures of the intake air pipe 3 and the recirculation valve 11 from a signal of the pressure difference sensor 18. Since the relationship between the pressure difference P1 and the actual EGR ratio $P_{EGR}$, as shown in FIG. 4, differs depending on the running condition of the internal combustion engine, in step 357, the operation corrects the pressure difference P1 based on the load state of the internal combustion engine and calculates the actual EGR ratio $P_{EGR}$ (first exhaust gas recirculation ratio). That is to say, the operation detects the pressure value pb of the intake air pipe 3, and based on the detected value, calculates the actual EGR ratio $P_{EGR}$ by correcting the pressure difference P1. In step 358, the operation calculates the control gain $\Delta K_{EGR}$ by a value which is obtained by subtracting the actual EGR ratio $P_{EGR}$ from the actual EGR ratio $T_{EGR}$ based on the graph shown in FIG. 7.

Figures 7, 8, 9, 10:
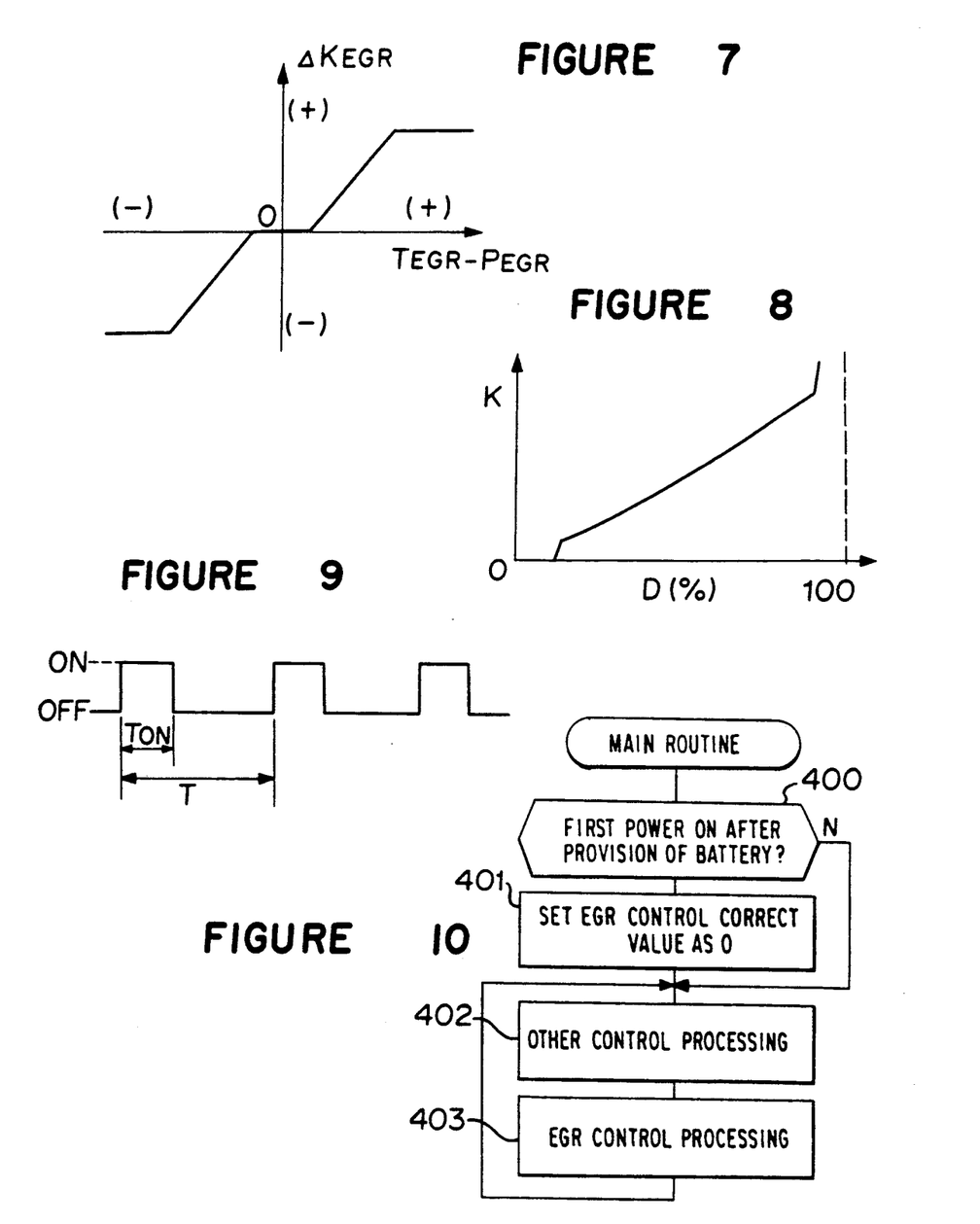
FIGS. 7 and 8 are graphs showing the characteristic of the device.
FIG. 9 is an explanatory diagram describing a control duty of the device.
FIGS. 10 and 11 are flow charts describing an operation of a second embodiment of the device.

FIG. 7 is a graph showing a characteristic of the control gain $\Delta K_{EGR}$. The value which is obtained by subtracting the actual EGR ratio $P_{EGR}$ from the target EGR ratio $T_{EGR}$ is denoted in the abscissa, and the value of the control gain $\Delta K_{EGR}$ which corresponds with the subtracted value is denoted in the ordinate, respectively.

In step 359, the operation calculates $T_{EGR}$ control correction value $K_{EGR}$ by adding the control gain $\Delta K_{EGR}$ to the control correction value $K_{EGR}$ before calculation. In step 360, the operation calculates the EGR control value K by adding the basic control quantity $K_{BASE}$ to the EGR control correction value $K_{EGR}$ which is obtained in step 359. In step 361, the operation calculates the control duty $D_{EGR}$ from the obtained EGR control value K, based on the graph of FIG. 8 showing the relationship between the EGR control value K and control duty D. In step 362, the operation drives the EGR solenoid 12 based on the control duty $D_{EGR}$. By such control, the difference between the target EGR ratio $T_{EGR}$ and the actual EGR ratio $P_{EGR}$ is nullified, and the target EGR ratio $T_{EGR}$ and the actual EGR ratio $P_{EGR}$ agree. FIG. 9 is an explanatory diagram showing the definition of the control duty D. Assuming the ON time as $T_{ON}$, and a single period as T, the control duty D is shown by the following equation.

$$D = \frac{T_{ON}}{T} \times 100(\%)$$

Furthermore, when the engine is for instance in an idling state, and not in the EGR operational range, the operation determines as N in step 353, and the operation sets the EGR control quantity K as 0 in step 363, as no EGR flow quantity. In step 361, the operation calculates the control duty $D_{EGR}$ from the EGR control quantity the value of which is 0. In step 362, the operation drives the EGR solenoid 12 by the control duty $T_{EGR}$.

Figure 11:
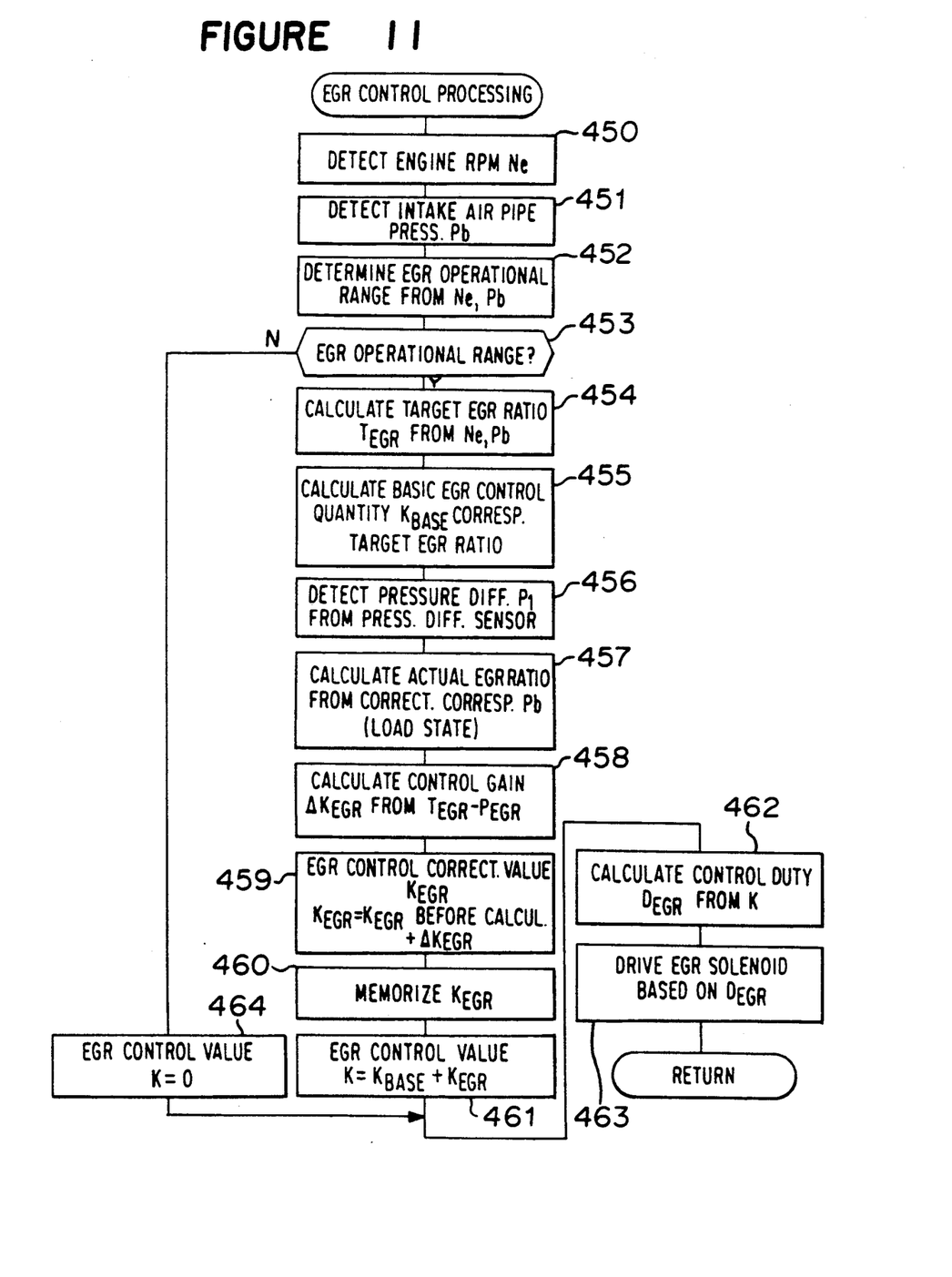

Next, FIGS. 10 and 11 are flow charts showing a second embodiment of the EGR control device according to the present invention. First of all, explanation will be given to the flow chart in FIG. 10.

In step 400, the operation determines whether power is ON, for the first time after the provision of the battery 20. The operation determines by detecting that the output voltage of the second power circuit 106 connected to the battery 20, becomes a high voltage value from a low voltage value. When the operation determines as Y, in step 401, the operation sets the EGR control correction value $K_{EGR}$ as 0. After that, the operation successively performs the other control processing (step 402) and the EGR control processing (step 403). Furthermore, in step 400, when the operation determines the determination whether the power is on for the first time after the provision of the battery 20, as N, that is, when the battery 20 is already provided, and the ignition key switch 21 is ON, the operation does not set the EGR control correction value $K_{EGR}$ as 0, but the operation uses the EGR control correction value $K_{EGR}$ which is memorized in the RAM 205 beforehand, which is utilized in the processing of steps 402 and 403.

Next, explanation will be given to the flow chart of FIG. 11.

Figure 6:
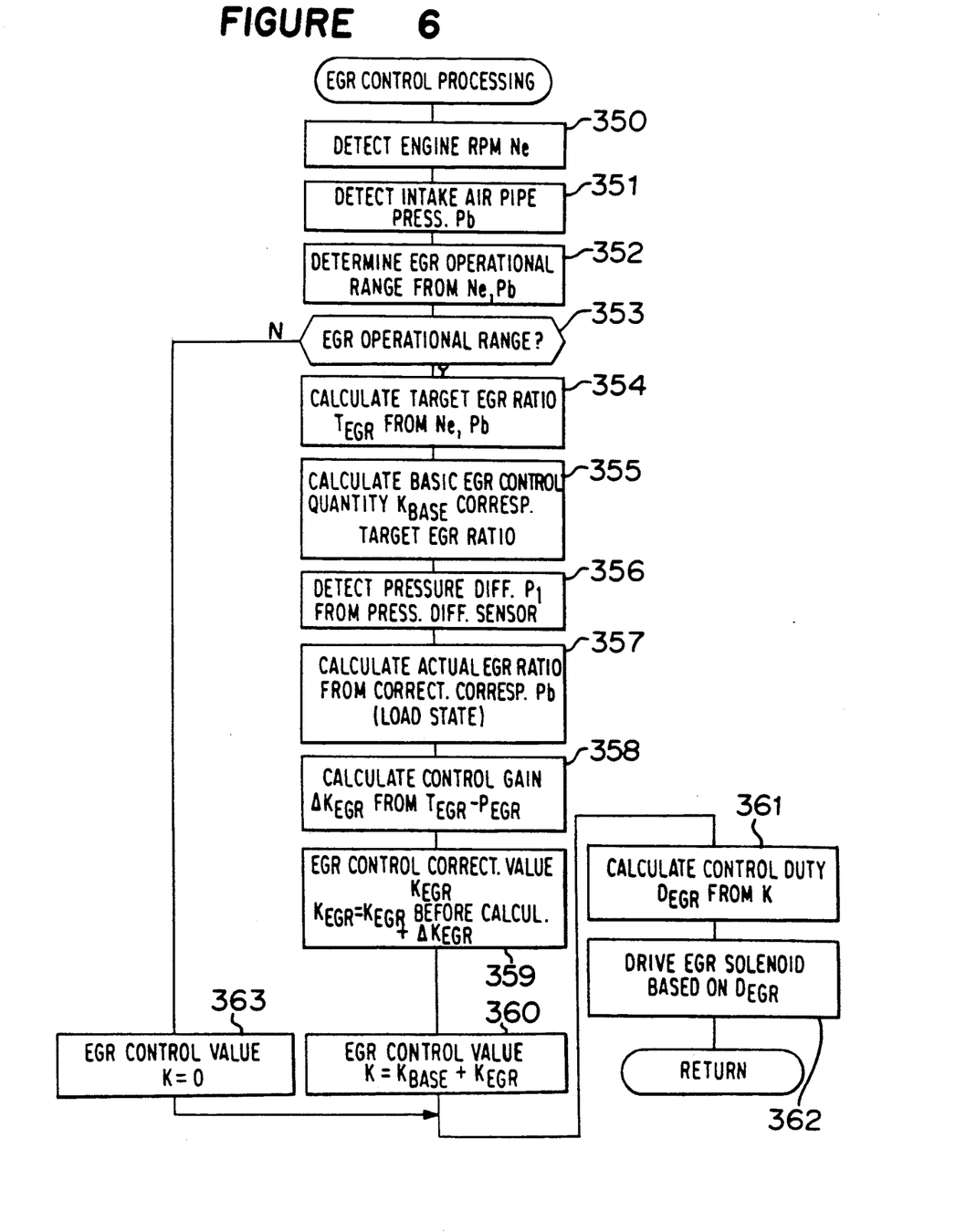

The processings in step 450 through 459 of this flow chart, are the same with those in steps 350 through 359 of the flow chart of FIG. 6. Therefore, the detailed explanation will be omitted. In steps 450 through 459, the operation calculates the EGR control correction value $K_{EGR}$ in the operation range of the EGR. In step 460, the operation memorizes the calculated EGR control correction value $K_{EGR}$. In step 461, the operation calculates the EGR control value K by adding the basic control quantity $K_{BASE}$ to the EGR control correction value $K_{EGR}$ which is obtained in step 459. In step 462, the operation calculates the control duty $T_{EGR}$ from the obtained EGR control value K. In step 463, the operation drives the EGR solenoid 12 based on the control duty $T_{EGR}$.

As stated above, the EGR control correction value $K_{EGR}$ is memorized when it is calculated. When the power is ON in this device, in case that it is not the first power ON after the provision of the battery 20, the operation uses the memorized EGR control correction value $K_{EGR}$ as a correction value thereof before calculation. Therefore, the EGR control just after the ignition key switch 21 is ON, is accurately performed.

Figure 12:
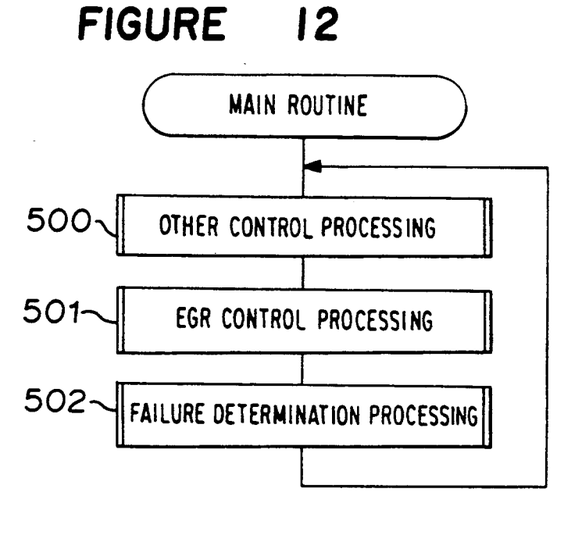
FIGS. 12 through 14 are flow charts describing an operation of a third embodiment of the device.
Figure 13:
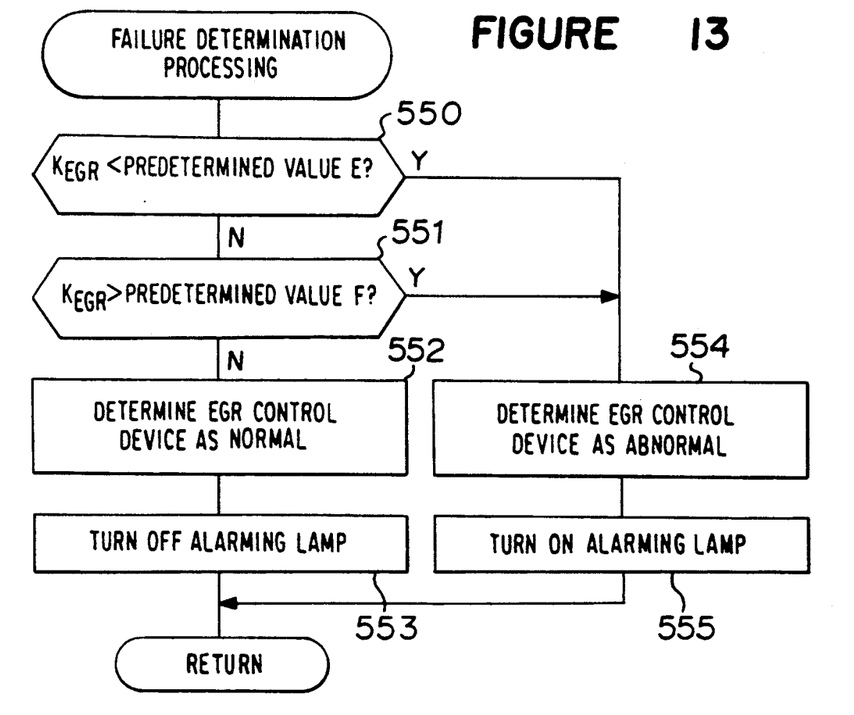
Figure 14:
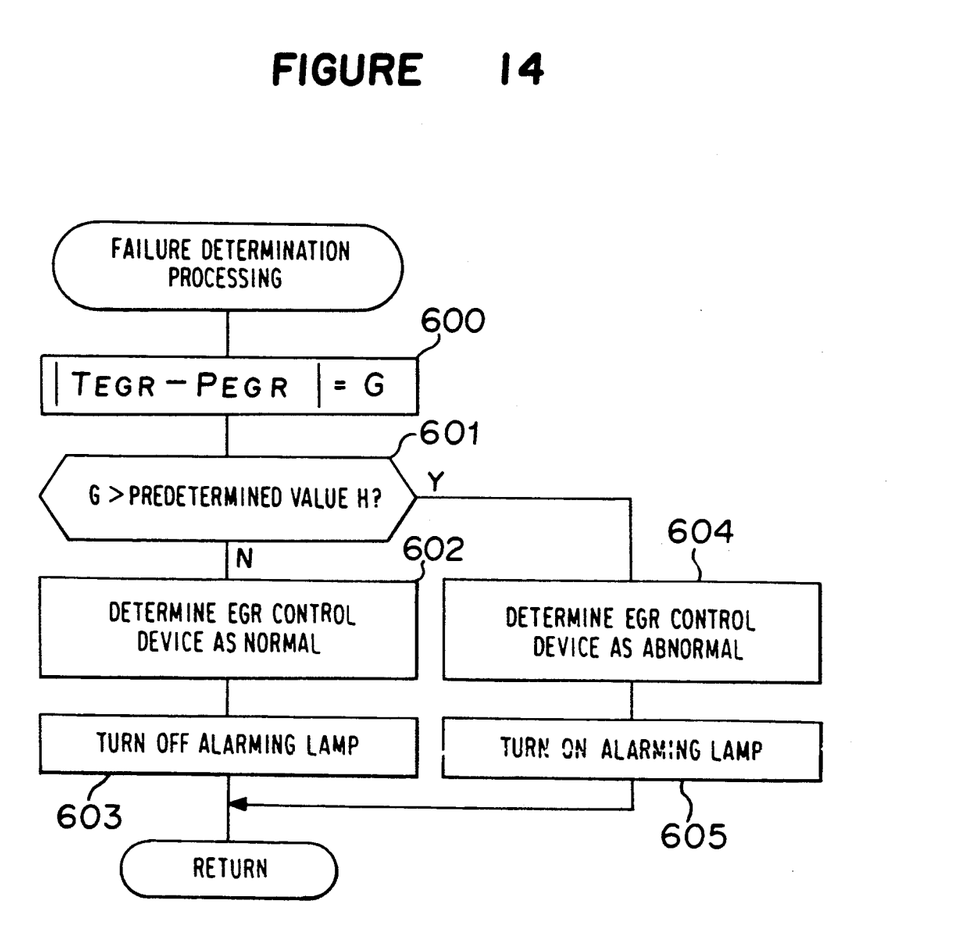

Furthermore, FIGS. 12 through 14 are flow charts showing an operation of a third embodiment of the EGR control device for the present invention. First of all, explanation will be given to the flow chart of FIG. 12.

In steps 500 and 501, similar to steps 300 and 301 of the flow chart of FIG. 5, the operation performs successively the other control processing and the EGR control processing. After the EGR control processing is performed in step 501, the operation performs the failure determination processing in step 502, and returns to step 500.

Next, explanation will be given to the details of the failure determination processing of the device according to the flow chart of FIG. 13.

In step 550, the operation performs the determination whether the EGR control correction value $K_{EGR}$ is smaller than the predetermined value E which is below a standard value as a result of, for instance, an exhaust gas test. When the EGR control correction value $K_{EGR}$ is larger than the predetermined value E, in step 551, the operation performs determination whether the EGR control correction value $K_{EGR}$ is larger than the predetermined value F which is above a standard value as a result of, for instance, an exhaust gas test. When the EGR control correction value $K_{EGR}$ is smaller than the predetermined value F, in step 552, the operation determines the EGR control device as normal, and set a flag of normality, and turns off the alarming lamp 23, in step 553. Furthermore, when the EGR control correction value $K_{EGR}$ is smaller than the predetermined value E, and the operation determines as Y in step 550, or when the EGR control correction value $K_{EGR}$ is larger than the predetermined value F, and the operation determines as Y in step 551, the operation determines the EGR control device as abnormal in step 554, and sets a flag of abnormality, and turns on the alarming lamp 23, in step 555. Therefore, in this invention, this EGR control device is determined as in failure, by detecting the disagreement between the target EGR ratio $T_{EGR}$ on the actual EGR ratio $T_{EGR}$.

Next, explanation will be given to another embodiment of the determination of failure of the EGR control device based on the flow chart of FIG. 14.

In step 600, the operation determines the absolute value of a value which is obtained by subtracting the actual EGR ratio $T_{EGR}$ from the target EGR ratio $T_{EGR}$, as G. In step 601, the operation performs the determination whether the absolute value G is larger than the predetermined value H the value which is a permissible standard as a result of, for instance, an exhaust gas test. When this absolute value H is smaller than the predetermined value H, in step 602, the operation determines the EGR control device as normal, and sets a flag of normality, and turn off the alarming lamp 23, in step 603. When the absolute value E is larger than the predetermined value H, and the operation determines as Y in step 601, the operation determines the EGR control device as abnormal in step 604, and sets a flag of abnormality, and turns on the alarming lamp 23, in step 605.

Furthermore, in this embodiment, the operation compares the absolute value G which shows the difference between the target EGR ratio $T_{EGR}$ and the actual EGR ratio $P_{EGR}$, and the predetermined value H, and as the result, determines the failure of the device at once. However, the operation may determine the failure of the device by recognizing that the relationship between the absolute value G and the predetermined value H continues for a certain time by introducing the clock means of the timer 202. The operation may count the number of abnormality in, for instance, the failure determination in steps 550 and 551 in FIG. 13 using the counter 201. The operation determines the failure, when the number of abnormality continuously amounts to a predetermined value.

Furthermore, in this embodiment, the operation determines the pressure difference between the pressures of the intake air pipe 3 and the recirculation valve 11 by providing the pressure difference sensor 18, as the pressure difference between two points. However, this pressure difference may be the difference between the absolute value of the pressure which is detected at adjacent to the exit of the recirculation valve 11, and the pressure value of the intake air pipe 3.

As apparent from the above explanation, the exhaust gas recirculation control device of this invention performs the control of increasing or decreasing of the passage area of the recirculation valve, so that the first exhaust gas recirculation ratio and the second exhaust gas recirculation ratio agree. Therefore, an accurate exhaust gas recirculation control can be performed which corresponds with the various running conditions. Furthermore, the difference between the first exhaust gas recirculation ratio and second exhaust gas recirculation ratio, or a value which corresponds with the difference, is memorized. Therefore, the exhaust gas recirculation control can be performed swiftly and accurately when the ignition switch is ON. Furthermore, since the failure is determined by detecting the disagreement between the first exhaust gas recirculation ratio and the second exhaust gas recirculation ratio, the failure of the device is directly and accurately detected.

Next, a failure diagnosis device of an exhaust gas recirculation control device of the present invention, will be explained referring the drawings.

Figure 15:
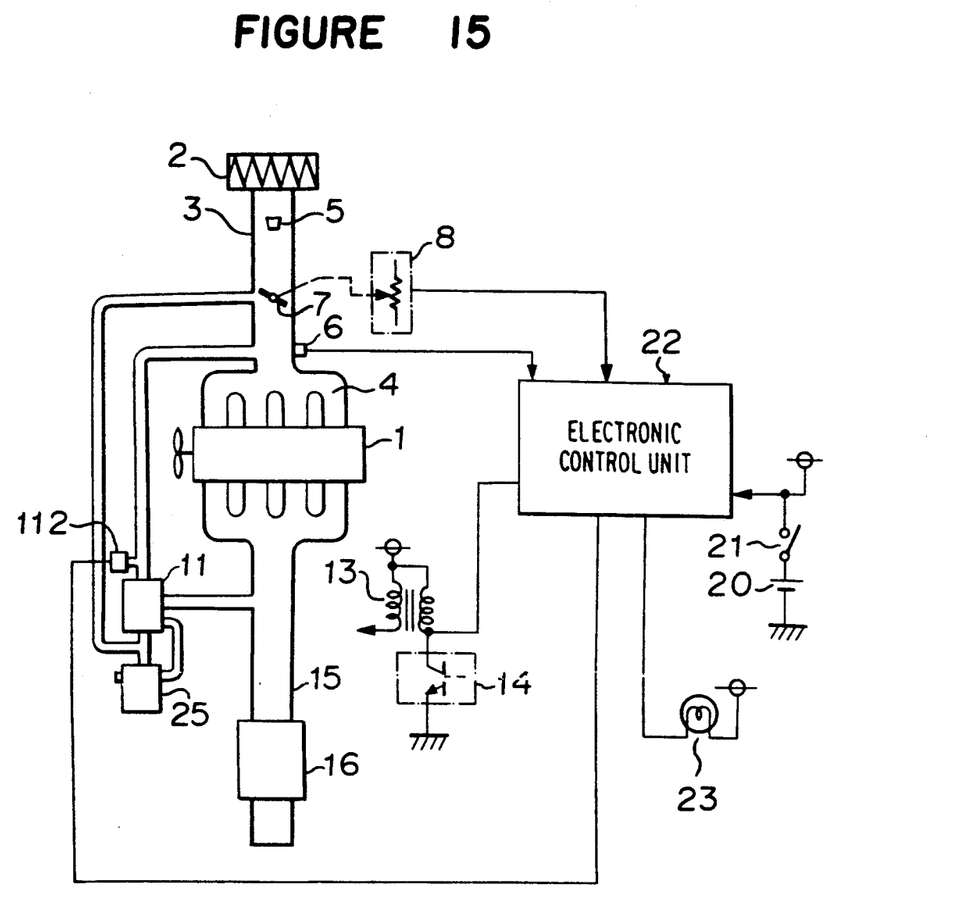
FIG. 15 is a block diagram showing an embodiment of a failure diagnose device of an exhaust gas recirculation control device according to the present invention.

FIG. 15 is a block diagram showing an embodiment of the failure diagnosis device of the exhaust gas recirculation control device according to the present invention. In FIG. 15, a reference numeral 1 designates an engine, 3, an intake air pipe, 4, an intake manifold, 5, an injector, 6, a pressure sensor which detects a pressure of the intake air pipe 3, 7, a throttle valve, 8, a throttle opening degree sensor, 11, a recirculation valve, 112, a pressure sensor provided at adjacent to an exit of the recirculation valve 11, 13, an ignition coil, 14, an igniter, 15, an exhaust pipe, 20, a battery, 21, an ignition key switch, 22, an electronic control unit, 23, an alarming lamp, and 25, a BPT valve.

In FIG. 15, the pressure sensor 6 is a semiconductor type pressure sensor which detects an intake air pressure for measuring a quantity of air which is sucked to the engine 1 from the intake air pipe 3 through the intake manifold 4. The injector 5 is located at the upstream of the throttle valve 7, and performs fuel injection. The throttle opening degree sensor 8 for detecting the opening degree of the throttle valve, is attached to the throttle valve 7. The ignition coil 13 performs the ignition by a signal from the igniter 14, and sends the generated ignition signal to the electronic control unit 22.

The recirculation valve 11 is a vacuum servo type valve which is located at the exhaust gas recirculation passage which connects the intake air pipe 3 with the exhaust pipe 15. The pressure sensor 112 is located at adjacent to the exit of the recirculation valve 11, detects a pressure of the exhaust gas recirculated from the recirculation valve 11, and sends the detected signal to the electronic control unit 22. The electronic control units 22 receives the respective signals of the pressure sensor 6, the throttle opening degree sensor 8 and the ignition coil 13, and controls the passage area of the EGR recirculation valve 11. The electronic control unit 22 receives the respective signals, obtains a control quantity of an EGR solenoid, not shown, for controlling the EGR flow quantity.

Figure 16:
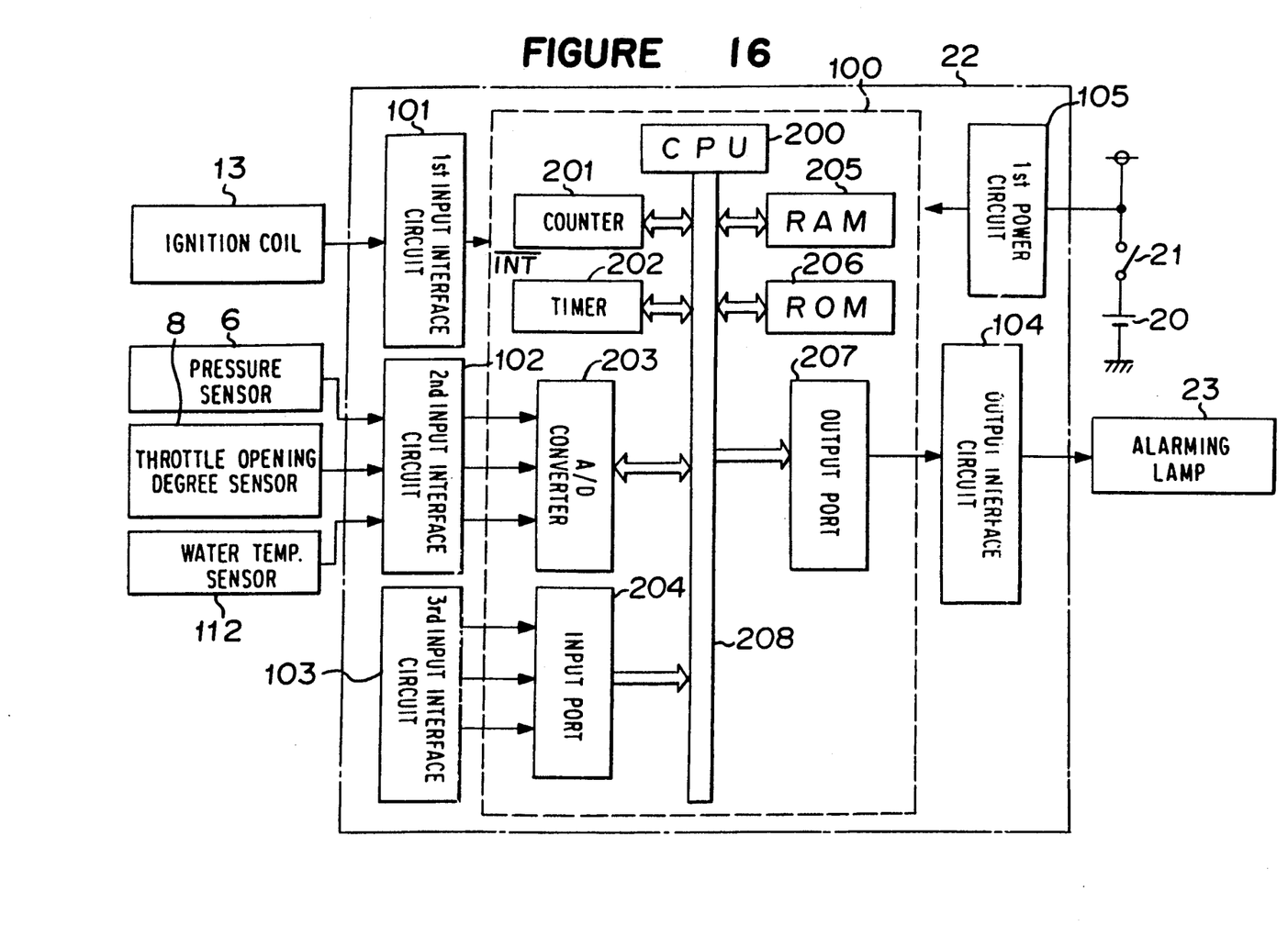
FIG. 16 is a block diagram of an electronic control unit which performs a control of the failure diagnose device.

FIG. 16 is a detailed block diagram of the electronic control unit 22. In FIG. 16, a numeral 100 designates a microcomputer, which is composed of the CPU 200 which calculates the control quantity of the EGR solenoid or the like according to the predetermined programs, the free running counter 201 for measuring a rotation period of the engine 1, the timer 202 which measures by clock a duty ratio of a drive signal which is applied to the EGR solenoid, the A/D converter 203 which converts an analogue signal to a digital signal, the RAM 205 which is utilized as a work memory, the ROM 206 in which programs are memorized, the output port 207 for outputting the drive signal and the common path 208 or the like. A numeral 101 designates the first input interface circuit which shapes a primary side ignition signal of the ignition coil 13 and outputs it to the microcomputer 100, as an interruption signal. When this interruption signal is generated, the CPU 200 is a value of the counter 201, and calculates a period of an engine revolution number from the difference between the currently read value and the preceding read value, which is memorized in the RAM 205. A numeral 102 designates a second input interface circuit, which receives the respective signals of the pressure sensors 6 and 112 and the throttle opening degree sensor 8, and outputs them to the A/D converter 203. A numeral 104 designates an output interface circuit, which amplifies the drive output from the output port 207, and outputs it to an EGR solenoid, not shown, so that the alarming lamp 23 is turned on when the EGR control device is in failure.

Figure 17:
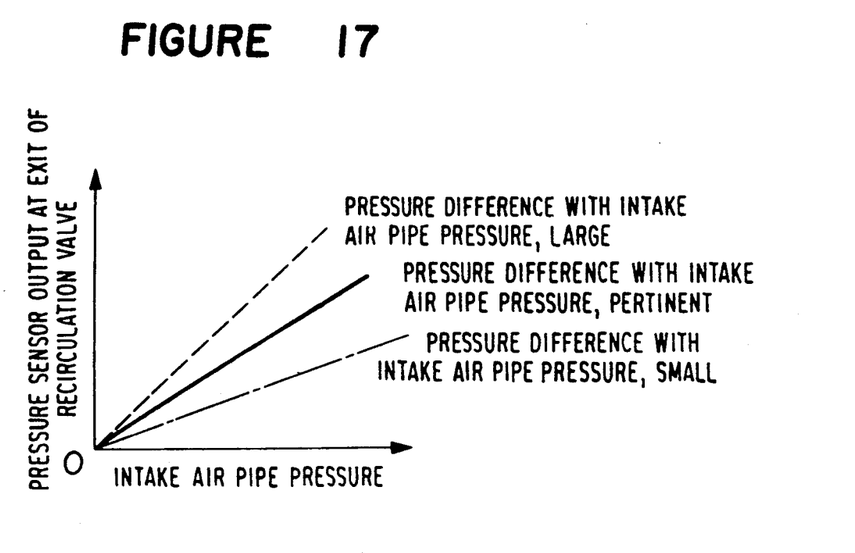
FIG. 17 is an explanatory diagram describing a relationship between pressures of a recirculation valve and an intake air pipe in the exhaust gas recirculation control device.

Next, FIG. 17 is an explanatory diagram showing a relationship between a pressure value at adjacent to an exit of the recirculation valve 11, detected by the pressure sensor 112, and a pressure value of the intake air pipe 3 which is detected by the pressure sensor 6. Generally speaking, as shown in FIG. 3, the larger the EGR quantity, the larger the pressure difference between the pressure value of the intake air pipe 3 and the pressure value at adjacent to the exit of the recirculation valve 11.

Figure 18:
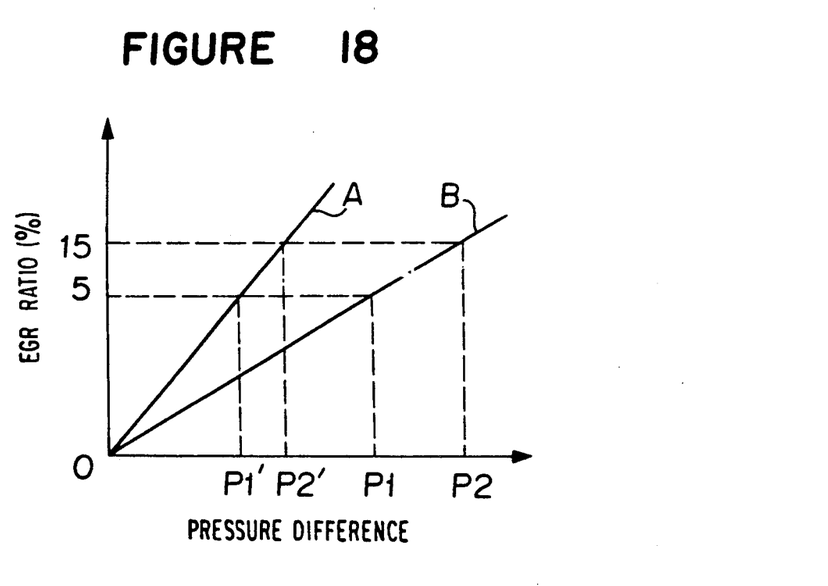
FIG. 18 is a graph showing a relationship between a pressure difference between pressures at an intake air pipe and an exit of the recirculation valve and EGR ratio in the exhaust gas recirculation control device.

FIG. 18 is a graph showing a relationship between the EGR ratio, and the pressure difference between the pressure value of the intake air pipe 3 and the pressure value at adjacent to the exit of the recirculation valve 11. Case A and case B in the diagram show load states of the internal combustion engine. When the EGR ratio is in the predetermined range of 5 to 15%, and when the engine is in the load state B, the difference portion (P2-P1) of the pressure difference corresponding with the range of the EGR ratio of 15% and 5%, is large compared with the difference portion (P2'-P1') of the pressure difference when the load state of the engine is A. Therefore, it is shown that the relationship between the EGR ratio and the pressure difference between the pressure value at the intake air pipe 3 and the pressure value at adjacent to the exit of the recirculation valve 11, differs depending on the load state of the internal combustion engine. In this invention, the pressure difference between the pressure value of the intake air pipe 3 and the pressure value at adjacent to the exit of the recirculation valve 11, is detected, and the detected value is corrected corresponding with the load state, and the device is determined as in failure when the corrected value is determined to be out of the predetermined range.

Figure 19:
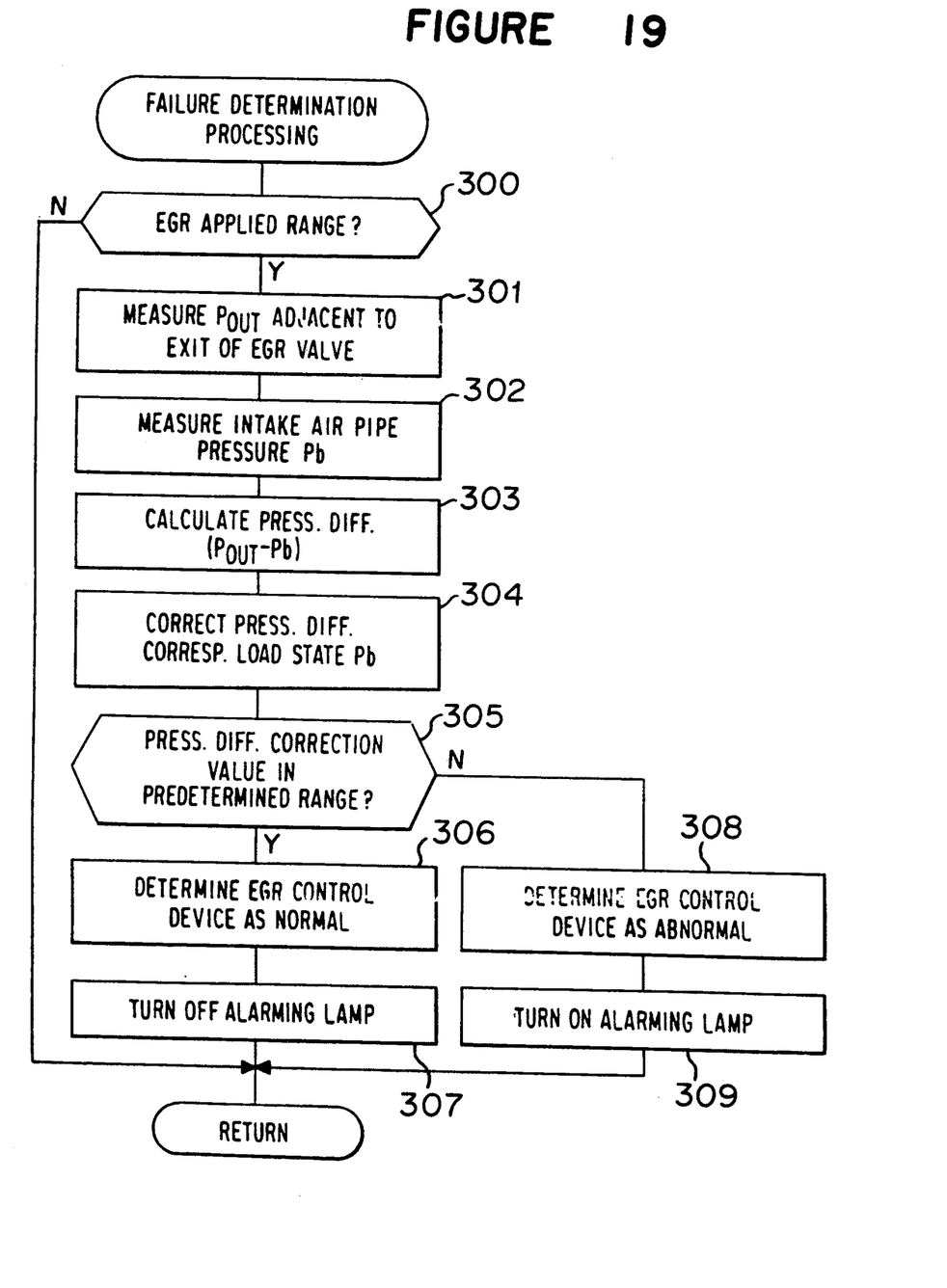
FIG. 19 is a flow chart describing an operation of the failure diagnosis device.

In the followings, explanation will be given to a detailed operation of the failure diagnosis device based on the flow chart of FIG. 19.

First of all, the operation performs the determination whether the engine is in the EGR applied range, in step 300. When there is the EGR flow quantity, and determination is Y, in step 301, the operation measures the pressure $P_{out}$ of the EGR valve, that is, at adjacent to the exit of the recirculation valve 11, through the pressure sensor 62. In step 302, the operation measures the pressure Pb of the intake air pipe 3 through the pressure sensor 6. In step 303, the operation calculates the pressure difference ($P_{out}$−Pb) between the pressure value at adjacent to the exit of the recirculation valve 11 and the pressure value of the intake air pipe 3.

When the pressure difference ($P_{out}$−Pb) is calculated, the load state of the engine is determined from the detected pressure value Pb of the intake air pipe 3, to make correction on the calculated pressure difference ($P_{out}$−Pb) corresponding with the load state of the internal combustion engine. In step 304, the operation corrects the pressure difference ($P_{out}$−Pb) corresponding with the pressure value Pb of the intake air pipe 3.

In step 305, the operation determines whether corrected pressure difference, that is, the pressure difference correction value is in a predetermined range. When the pressure difference correction value is in the predetermined range, in step 306, the operation determines the EGR control device as normal, and sets a flag of normality, and turns off the alarming lamp 23, in step 311. Furthermore, when the pressure difference correction value is out of the predetermined range, and the operation determines as N in step 305, the operation determines the EGR control device as abnormal in step 308, and sets a flag of abnormality, and turns on the alarming lamp 23 in step 309.

Furthermore, in this embodiment, the operation determines the running condition of the internal combustion engine, that is, the load state of the internal combustion engine from the pressure value Pb of the intake air pipe 3 which is already detected, and corrects the pressure difference ($P_{out}$ − Pb) between the pressure value at adjacent to the exit of the recirculation valve 11 and the pressure value of the intake air pipe 3 based on this load state. However, the correction may be performed based on a function value which shows a relationship between the engine revolution number and the throttle opening degree, or a measured value intake air quantity.

As apparent in the above explanation, in the first invention of the failure diagnosis device of the exhaust gas recirculation control device according to the present invention, the difference pressure between the intake air pipe pressure which is detected by the running condition detecting means, and the pressure at the exit of the recirculation valve which is detected by the pressure detecting means, is calculated, and the difference is corrected based on the intake air pipe pressure, and the alarming is outputted when the correction value is out of the predetermined range. Furthermore, in the second invention, the difference pressure is corrected based on the measured value of the intake air quantity to the internal combustion engine, or the function value of the engine revolution number and the throttle opening degree. Therefore, the invention has an effect in which a failure state of the device by the increase of the EGR flow quantity due to the deterioration of BPT in the exhaust gas recirculation control device, and by the decrease of the EGR flow quantity due to the clogging of the valve, can precisely be diagnosed corresponding with the load state of the internal combustion engine.

What is claimed is:

1. An exhaust gas recirculation control device adapted to control a recirculation of a part of exhaust gas of an internal combustion engine back to the internal combustion engine which comprises:
   a recirculation pipe for recirculating the exhaust gas of the internal combustion engine back to an intake air pipe;
   a recirculation valve for controlling a flow quantity of the exhaust gas flowing in the recirculation pipe;
   a recirculation valve passage area controlling means for controlling a passage area of the recirculation valve;
   a running condition detecting means for detecting a running condition of the internal combustion engine;
   a pressure difference detecting means for detecting a pressure difference between pressures at two arbitrary points in the recirculation pipe from an exit of the recirculation valve to the intake air pipe or a pressure difference between pressures at two arbitrary points in the recirculation pipe from an inlet of the recirculation valve to an exhaust pipe;
   a first exhaust gas recirculation ratio calculating means for calculating a first exhaust gas recirculation ratio from the pressure difference and a detected value of the running condition detecting means; and
   a second exhaust gas recirculation ratio calculating means for calculating a second exhaust gas recirculation ratio corresponding with the detected value of the running condition detecting means;
   wherein a feed back control is performed in which the passage area of the recirculation valve is increased or decreased so that a difference between the first exhaust gas recirculation ratio and the second exhaust gas recirculation ratio is nullified.

2. The exhaust gas recirculation control device of claim 1, wherein the pressure difference is a difference between pressure values of the intake air pipe and at the exit of the recirculation valve.

3. The exhaust gas recirculation control device of claim 1, further comprising a memory means for memorizing the difference between the first and the second exhaust gas recirculation ratios, or a value corresponding with the difference.

4. The exhaust gas recirculation control device of claim 1, further comprising a failure diagnosis means for diagnosing a failure of the exhaust gas recirculation control device by detecting a disagreement between the first and the second exhaust gas recirculation ratios.

5. A failure diagnosis device of an exhaust gas recirculation device adapted to control a recirculation of a part of exhaust gas of an internal combustion engine back to the internal combustion engine which comprises:
   a recirculation pipe for recirculating the exhaust gas of the internal combustion engine back to an intake air pipe;
   a recirculation valve for controlling a flow quantity of the exhaust gas flowing in the recirculation pipe;
   a recirculation valve passage area controlling means for controlling a passage area of the recirculation valve;
   a running condition detecting means for detecting a running condition of the internal combustion engine;
   a pressure detecting means for detecting a pressure at an exit of the recirculation valve;
   a pressure difference detecting and correcting means for detecting a pressure difference between an intake air pipe pressure detected by the running condition detecting means and the pressure at the exit of the recirculation valve, and correcting the pressure difference based on the intake air pipe pressure;
   a determining means for determining whether a corrected value of the pressure difference is in a predetermined range; and
   an alarming means for alarming when the determining means determines that the corrected value of the pressure difference is out of the predetermined range.

6. A failure diagnosis device of an exhaust gas recirculation device adapted to control a recirculation of a part of exhaust gas of an internal combustion engine back to the internal combustion engine which comprises:
   a recirculation pipe for recirculating the exhaust gas of the internal combustion engine back to an intake air pipe;
   a recirculation valve for controlling a flow quantity of the exhaust gas flowing in the recirculation pipe;
   a recirculation valve passage area controlling means for controlling a passage area of the recirculation valve;
   a running condition detecting means for detecting a running condition of the internal combustion engine;
   a pressure detecting means for detecting a pressure at an exit of the recirculation valve;

a pressure difference detecting and correcting means for detecting a pressure difference between an intake air pipe pressure detected by the running condition detecting means and the pressure at the exit of the recirculation valve, and correcting the pressure difference by a value of a function of a measured value of an intake air quantity for the internal combustion engine or a revolution number of the internal combustion engine and a throttle opening degree;

a determining means for determining whether a corrected value of the pressure difference is in a predetermined range; and an alarming means for alarming when the determining means determines that the corrected value of the pressure difference is out of the predetermined range.

* * * * *